United States Patent [19]
Wright

[11] 3,972,633
[45] Aug. 3, 1976

[54] WHEEL HUB ASSEMBLY
[75] Inventor: Allen J. Wright, Portland, Oreg.
[73] Assignee: Warn Industries, Inc., Kent, Wash.
[22] Filed: Feb. 27, 1975
[21] Appl. No.: 553,567

[52] U.S. Cl. .................................................. 403/1
[51] Int. Cl.² ...................... B60B 27/00; F16D 1/06
[58] Field of Search .............. 403/1; 192/38, 44, 47, 192/93 A

[56] References Cited
UNITED STATES PATENTS

| | | | |
|---|---|---|---|
| 2,497,361 | 2/1950 | Kesterton | 192/38 X |
| 3,050,321 | 8/1962 | Howe et al. | 403/1 |
| 3,300,002 | 1/1967 | Roper | 192/38 X |
| 3,414,096 | 12/1968 | Reed | 192/44 X |
| 3,491,864 | 1/1970 | Niu | 192/38 X |
| 3,669,476 | 6/1972 | Wilson | 403/1 |
| 3,753,479 | 8/1973 | Williams | 403/1 X |

Primary Examiner—Werner H. Schroeder
Assistant Examiner—Wayne L. Shedd
Attorney, Agent, or Firm—Graybeal, Barnard & Uhlir

[57] ABSTRACT

A wheel hub assembly for a front wheel of a four wheel drive vehicle. The hub assembly has an unlocked position which permits free overrun of the wheel and a locked position where the wheel is fixedly secured to its drive axle. It comprises a conventional roller clutch mechanism in which there is an outer housing, an inner driving hub and a roller clutch assembly mounted between the housing and the hub. A clutch lock assembly, connected to the housing through a spring connection, is positioned in the outside portion of the housing and comprises a lock cage having a plurality of lock fingers that are movable axially inwardly to engage related slots in a roller clutch cage and thus mechanically interconnect the outer housing to the roller clutch assembly.

31 Claims, 8 Drawing Figures

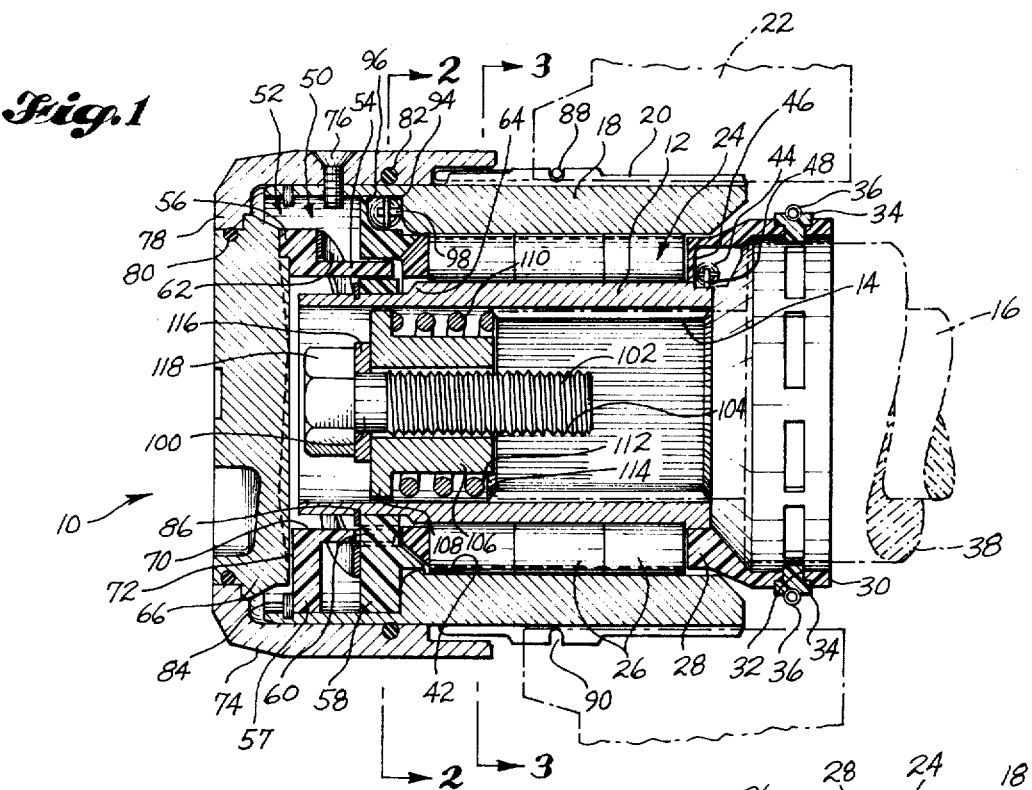
Fig. 1
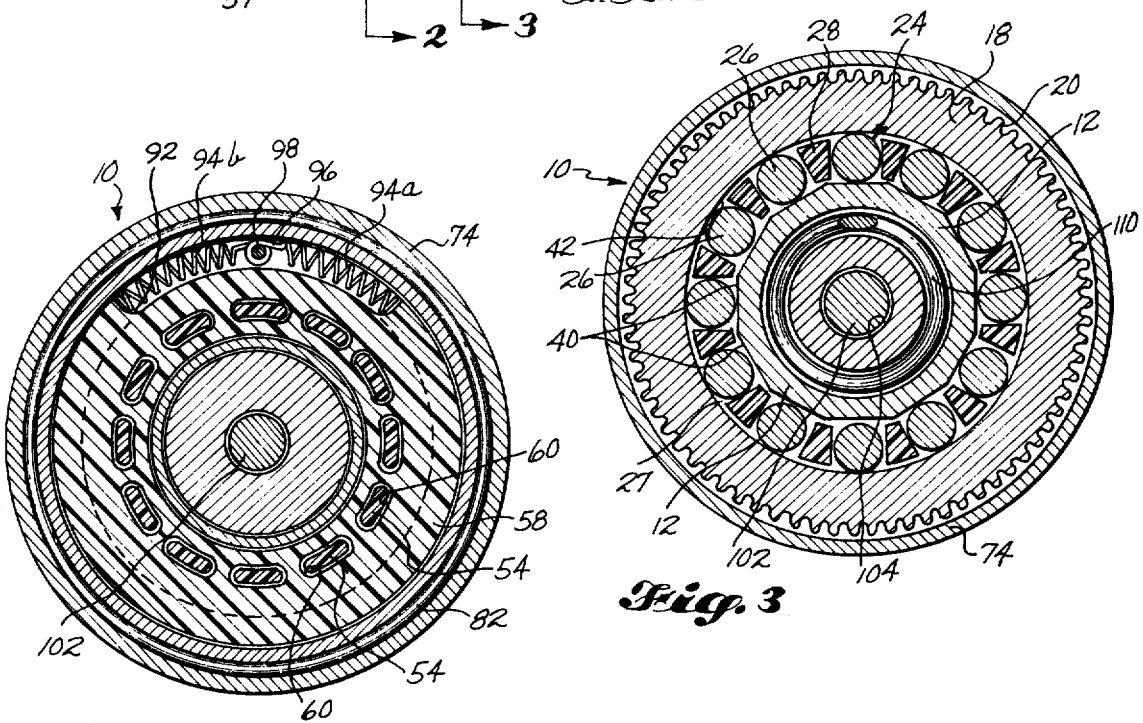
Fig. 2
Fig. 3

WHEEL HUB ASSEMBLY

BACKGROUND OF THE INVENTION

1. Field of the Invention

The present invention relates to wheel hubs such as those used in the front wheels of four wheel drive automotive vehicles, in which the wheel can be either locked to its related drive axle, or arranged so as to be able to overrun its drive axle.

2. Description of the Prior Art

In four wheel drive automotive vehicles, it is sometimes desirable to have all four wheels fixedly connected to their drive axles, for example, in a situation where the vehicle is traveling over quite difficult terrain, or when compression braking is needed. However, in many situations where the vehicle is traveling over a paved road surface, it is more advantageous to disengage the front wheels, so that they can rotate independently of their drive axle or at least overrun the axle. Accordingly, there appears in the prior art a number of wheel locking hubs which permit the front wheels of a four wheel drive vehicle to operate in both locked and unlocked modes.

For example, in U.S. Pat. No. 2,684,140 there is shown a wheel hub that has an overrunning interior clutching member through which the drive axle can transmit power to the front wheel, but which permits the front wheel to freely overrun the drive axle. Additionally, there is a locking mechanism which can selectively be moved into locking engagement to form a positive mechanical connection between the driving and driven portions of the hub so as to rigidly lock the wheel to the drive axle. U.S. Pat. No. 2,884,101 shows a substantially similar system with the addition of an O-ring to cause frictional engagement between the roller cage of the clutch mechanism with stationary structure. U.S. Pat. No. 3,055,471 shows yet another hub similar to the two mentioned above, but with a set of friction shoes to cause frictional engagement of the roller cage of the clutching mechanism with stationary structure.

U.S. Pat. No. 3,351,364 illustrates a hub lock having a first position where the outer housing that is connected to the wheel can rotate completely independently of its associated drive axle. There is a locking member movable toward the hub member to move a set of dowels into grooves formed between the driving hub and the outer housing to cause a positive locking engagement. Three other hub locks similar to that shown in U.S. Pat. No. 3,351,364 are shown in the following three patents: U.S. Pat. No. 3,442,361, U.S. Pat. No. 3,753,479 and U.S. Pat. No. 3,718,213. In these three last named patents, there is a locking mechanism which is moved axially into and out of locking engagement through a spring connection with its actuating member. Thus, if at the time the actuating member is moved to its lock position, there is misalignment between the components, the actuating spring remains stressed until the components shift into alignment, at which time the locking mechanism goes into engagement.

In U.S. Pat. No. 3,123,169 there is shown a wheel hub having an overrunning clutch mechanism comprising an interior driving hub connected to a drive axle, an outer housing connected to the driven wheel, and a roller clutch assembly mounted therebetween. There is friction means engaging the roller cage to cause clutching engagement between the driving hub and the housing when the axle is rotated under power. In its free wheeling mode, the wheel is permitted to overrun its related axle, with the roller clutch assembly moving out of clutching engagement. Thus hub also has a lock position which is accomplished by a magnetically actuated plate causing a friction ring to engage the cage of the roller clutch assembly and thus cause engagement between the housing and the cage of the clutch assembly. With this friction plate causing the cage to rotate with the housing, the clutch assembly effectively locks the housing to the drive hub.

There is also shown in U.S. Pat. No. 3,123,169 a somewhat similar arrangement which, instead of providing frictional interconnection between the roller cage of the clutch assembly and the driven housing, provides a positive mechanical interlock between such members. This is accomplished by providing a locking finger in the driven housing which protrudes inwardly to engage the roller cage.

SUMMARY OF THE INVENTION

The wheel hub assembly of the present invention comprises an inner driving hub that is adapted to be connected to a drive axle for rotation therewith, this hub having a plurality of outwardly facing cam surfaces. Surrounding the hub is an outer driven housing adapted to be connected to a front wheel of an automotive vehicle for rotation with the wheel, this housing having an inwardly facing clutch surface. Positioned between the clutch surface and the cam surfaces of the inner hub is a clutch assembly comprising a plurality of wedging clutch elements, desirably roller clutch elements, and a cage which properly positions the clutch elements between the hub and the housing. The roller clutch elements are movable between an engaged position where the elements are wedged between the cam surfaces of the hub and the outer clutch surface of the housing, and an intermediate release position where the housing can overrun the hub. There is a clutch lock means having a first unlocked position in which the clutch assembly is permitted to move between its engaged position and its release position as described above, and a second position in which it provides a positive interlock of the cage means of the roller clutch assembly with the housing to cause the cage means to rotate with the housing, which in turn causes the hub and the housing to be in constant clutching engagement. Additionally, there is a lock shift compensating means by which said lock means is permitted to shift relative to at least one of the hub and the housing, so as to permit limited relative rotation between the hub and the housing without damaging the components of the hub assembly.

In the preferred form, the lock shift compensating means comprises a lock cage movable axially between an engaged and a disengaged position. A manually rotatable actuating cam acts against a corresponding cam face on the lock cage to move it to its engaged position, against the urging of a release spring which urges the lock cage away from its engaged position. The lock cage is in turn mounted to a bushing connected to the housing through a spring connection that permits limited rotational movement between the bushing with its associated lock cage and the housing.

In operation with the locking means in its disengaged position, the wheel hub acts in the manner of a conventional overriding clutch, wherein the axle can drive its associated wheel under power, and where the wheel is permitted to freely overrun its drive axle. The hub assembly is placed in its locked position by turning an operating dial of the actuating cam to move the lock cage axially to its locked position. In the locking mode, the roller cage of the roller clutch mechanism is caused to rotate with the housing, thus effectively locking the housing to the drive hub through the action of the roller clutch mechanism. However, in the event that there is some shifting between the hub and the housing (i.e. due to gradual "scrubbing" of the housing about the hub), the spring mounting of the lock cage bushing permits the roller clutch cage to shift rotatably with respect to the housing. As such shifting continues, the cam surfaces between the actuating dial and the lock cage move away from the lock position to permit the lock cage to become disengaged and shift rotatably to its next locking position where it goes back into its locking mode.

In accordance with another facet of the present invention, the hub assembly is mounted to the drive axle through a yieldable spring mounting that permits limited axial movement of the hub assembly in an axially outward direction. Thus, if the wheel itself tends to move outwardly on its axle mounting due to articulation about the wheel mounting, the hub assembly is able to shift laterally with its associated wheel.

BRIEF DESCRIPTION OF THE DRAWINGS

FIG. 1 is a longitudinal sectional view of the hub assembly of the present invention;

FIG. 2 is a transverse sectional view taken along line 2—2 of FIG. 1;

FIG. 3 is a transverse sectional view taken along line 3—3 of FIG. 1;

DESCRIPTION OF THE PREFERRED EMBODIMENT

Figure 4A:
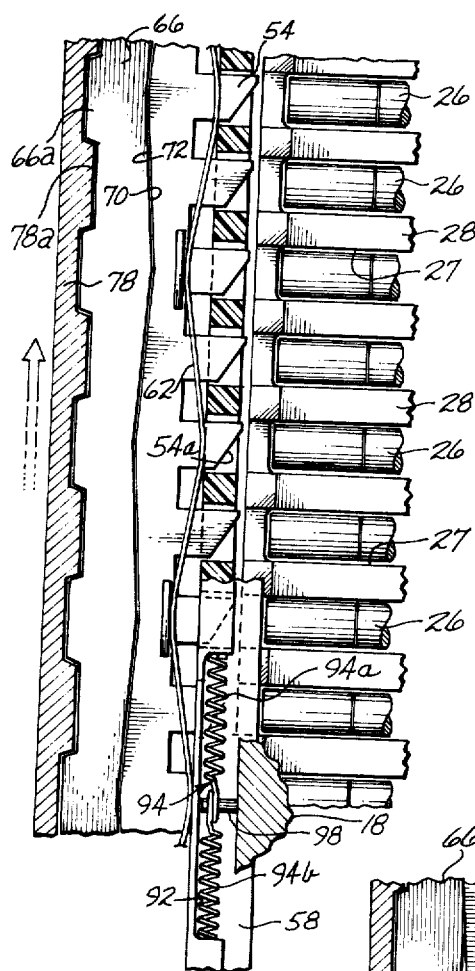
FIGS. 4A–4D are a series of layout views of the periphery of the clutch locking mechanism of the present invention in four different operating positions.
Figure 4B:
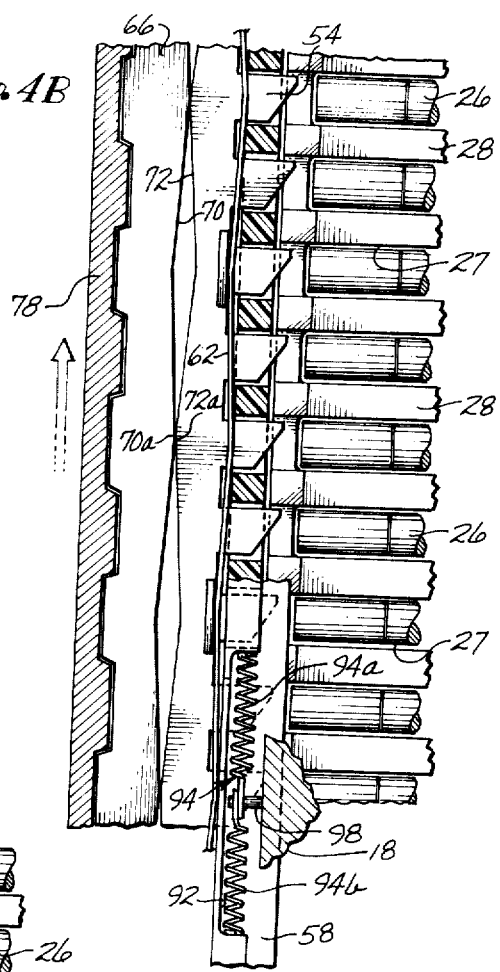

The wheel hub assembly 10 of the present invention is adapted to be mounted to a wheel assembly, usually a front wheel assembly, of a four wheel drive automotive vehicle. In describing this hub assembly, the longitudinal axis of the hub assembly is considered to be coincident with the axis of rotation of the hub assembly, this of course being coincident with the axis of rotation of the wheel assembly to which it is mounted. The terms "inner" and "outer" or "inward" and "outward" shall denote proximity or distance from the longitudinal axis of the hub assembly 10. The term "outside" shall denote that portion of the hub assembly which is further from the longitudinal center line of the vehicle to which the hub assembly is mounted and which is thus the exposed portion of the hub assembly, while the term "inside" shall denote that portion of the hub assembly 10 nearer the longitudinal center line of the automotive vehicle. The hub assembly 10 comprises an inner hub 12 having an interior spline 14 by which the hub 12 can be mounted to a drive axle 16 of an automotive vehicle. Surrounding the hub 12 and spaced radially outwardly therefrom is an outer housing 18 having an outer spline 20 by which the housing 18 is connected to the automobile wheel, indicated in dotted lines at 22. Positioned between the inner hub 12 and the housing 18 is a clutch assembly 24 which comprises a plurality of roller clutch wedging elements 26 mounted in slots 27 of an associated cage 28 which keeps the roller elements properly positioned around the circumference of the hub 12.

The cage 28 has at its inside edge an annular flange portion 30 having about its circumference a plurality of slots 32 in which are mounted friction shoes 34. A tension spring 36 is positioned circumferentially around the shoes 34 to press the shoes 34 radially inwardly against stationary vehicle structure 38 in which the drive axle 16 is mounted.

The outer surface of the hub 12 is formed with a plurality of flat longitudinal cam surfaces 40, each of which cam surfaces 40 is adapted to engage a respective group of aligned roller elements 26 in clutching engagement with an inner cylindrical clutching face 42 of the housing 18. To urge the cage 28 to an intermediate position where the roller elements 26 are centered with respect to their cam surfaces 40 and thus in a non-clutching position, there is a centering spring 44 interposed between the hub 12 and the cage 28. Specifically, this centering spring 44 is mounted in a recess 46 formed as an arcuate segment in the inside portion of the cage 28. The spring 44 is mounted by its center portion to a pin 48 connected to the hub 12 and extending into the recess 46, with two lateral portions of the spring 44 pressing outwardly against opposite sides of the portions of the cage defining the recess 46. Thus, this spring 44, pushing outwardly against opposed surfaces of the cage 28, yieldingly urges the cage 28 and its associated roller clutch elements 26 into an intermediate non-engaged position, as shown in FIG. 3.

The components of the hub assembly 10 described thus far are, in and of themselves, known in the prior art and are arranged to function herein in the manner of an overrunning clutch. To describe this function briefly, the frictional force exerted by the shoes 34 is sufficient to overcome the urging of the centering spring 44 so that the roller cage 28 tends to remain stationary with respect to the automotive vehicle. Thus, when the axle 16 rotates the hub 12 under power, the clutch assembly 24 lags behind, with the roller clutch elements 26 being wedged between the cam surfaces 40 of the hub 12 and the clutching face 42 of the housing 18, so that power is transmitted to the wheel 22. However, if the wheel 22 begins to overrun the hub 12 (this occurring, for example, when the vehicle is turning a corner and the wheel 22 is the outside wheel), the housing 18 moves ahead of the hub 12, so that the rollers 26 go out of clutching engagement. The action of the shoes 34 prevents the roller elements 26 from becoming locked up in the opposite direction so as to prevent free overrun of the housing 18. When the wheel 22 ceases to overrun its drive axle 16, the roller elements 26 move back into clutching engagement, by virtue of the action of the shoes 34, so that drive is again transmitted to the wheel 22.

In the situation where the power transmission to the drive axle 16 is disengaged so that the axle 16 remains stationary, the centering spring 44 moves the cage 28 toward its center position so that the roller clutch elements 26 remain disengaged. In this position, the outer housing 18 and its associated wheel 22 are able to rotate freely in either direction.

As indicated above, the previously described components and their operation as an overrunning drive clutch assembly, are in and of themselves known in the prior art. Attention is now directed to the clutch lock assembly 50, by which the housing 18 is positively locked to the inner hub 12, without permitting free overrun.

It is believed that the operation of this clutch lock assembly 50 will be better understood, if a detailed description of the same is preceded by a general description of its functional features. The main function of the clutch lock assembly 50 is to provide a positive interconnection between the roller cage 28 and the housing 18, so that any relative rotation of the housing 18 with respect to the hub 12 in either direction will cause the roller elements 26 to immediately move into wedging engagement between the cam surfaces 40 of the hub 12 and the clutching face 42 of the housing 18. This effectively makes a constant interlock between the wheel 22 and the drive axle 16.

However, under some conditions, it is possible for "scrubbing" to occur between the roller elements and the outer cylindrical clutching surface 42 of the housing 18. This could occur, for example, where the wheel is subjected to sufficient vibration to cause very small increments of movement of the roller clutch elements 26 into and out of engagement between the surfaces 40 and 42. To alleviate this situation, the clutch lock mechanism 50 is provided with a shift mechanism by which the interconnection between the cage 28 and housing 18 can yield under spring loading, and actually disengage from its lock position and move to an adjacent locking position, thus preventing possible damage to the components of the hub assembly.

To describe the clutch lock assembly 50 more particularly, there is a circular lock cage 52 having a plurality of lock fingers 54 fixedly connected to a mounting ring 56 and extending longitudinally in an inside direction toward the outside end of the roller cage 28. The ring 56 has a plurality of centering lugs 57 on its periphery to mount the cage in the outside end portion of the housing 18. Positioned in an inside direction from mounting ring 56 of the lock cage 52 is an annular cage housing 58 having a plurality of longitudinal slots 60, each of which receives a related lock finger 54. Thus the cage bushing 58 and lock cage 52 are rotatably fixed to one another, but are able to move longitudinally with respect to one another by virtue of the slide mounting of the lock fingers 54 in the slots 60. Interposed between the outside face of the cage bushing 58 and the inside face of the lock cage 52 is a wave spring 62 which urges the lock cage 52 in an outside direction away from the cage bushing 58 to its unlocked position. The bushing 58 is mounted at the outside end portion 64 of the hub 12. Movement of the lock cage 52 against the urging of the spring 62 in an inside direction causes the lock fingers 54 to become engaged in the outside end portion of related slots 27 of the roller cage 28.

To move the lock cage 52 between its locking and unlocking positions, there is provided a circular actuating cam member 66 mounted at the outside end portion of the hub assembly 10. This actuating cam 66 is in the form of a manually operated dial member, having upstanding hand grip portions 68 by which the dial cam member 66 can be rotated between its locking and unlocking positions.

The inside facing circumferential face 70 of the cam member 66 is a cam surface and hence is contoured in a "wavy" configuration so that the sloping cam surfaces are moderately slanted from a plane perpendicular to the longitudinal axis along a circumferential path. The outside facing circumferential surface 72 of the lock cage 52 is similarly contoured to make a matching cam surface. The configuration of the cam surfaces 70 and 72 can best be seen in FIGS. 4A–4D. In the particular embodiment shown herein, each slanted segment of the cam surfaces 70 and 72 have an arcuate length of about 60° so that a 60° rotation of the actuating dial member 66 in either direction moves the lock cage 52 its full length of axial travel either into or from its lock position.

This combination dial cam member 66 is rotatably mounted in an end cap 74 mounted around the outside end of the housing 18 and connected thereto by flathead screws 76. The outside edge of the cap 74 is formed with an annular inturned lip 78 to retain the dial 66, and a pair of O-rings 80 and 82 provide a seal between the cap 74 and, respectively, the perimeter of the dial 66 and the housing 18. Also, there is a first retaining ring 84 mounted within the outside end of the housing 18 to retain the lock cage 52 in place, and a second retaining ring 86 mounted around the outside end of the hub 12 to hold the cage bushing 58 in place. Around the circumference of the housing 18, there is a retaining spring member 88 made up of a plurality of U-shaped segments that interfits in a circumferential groove 90 formed in the outside end portions of the housing spline 20. The function of this retaining spring 88 is to rigidly lock the housing 18 to the vehicle wheel hub when installed.

A recess 92 is formed in the circumference of the bushing 58 as an arcuate segment thereof, to accommodate a bushing centering spring 94 which is compressibly fitted therein. This spring 94 has a center loop 96 which receives a pin 98 mounted to and extending from the housing 18. Thus, the spring 94 permits limited rotational movement between the bushing 58 and the housing 18, while urging the two back to a "center" position where the opposing forces of the two spring segments 94a and 94b balance each other.

To mount the assembly 10 to the drive axle 16, there is provided a mounting stud or cap screw 100 having a shank portion 102 the end portion of which is threaded into a longitudinal socket 104 formed at the outside end of the axle 16. Mounted to and surrounding the upper shank portion 102 is a spring retaining sleeve 106 having an outside annular lip 108. A spiral compression spring 110 is mounted around the sleeve 106 and presses from the lip 108 against the outer face 112 of the axle 16 and also engages the outside facing circumferential edge 114 of the splines 14 of the inner hub 12. A lock washer 116 is provided between the head 118 of the cap screw 100 and the retaining sleeve 106.

To describe the operation of the present invention, reference is now made to FIGS. 4A through 4D, which show the main components of the clutch lock assembly 50 in a circumferential layout configuration in four different operating positions. To orient the viewer with the layout of FIGS. 4A through 4D, let it be assumed that the viewer is looking downwardly on a hub assembly 10 mounted to a front left wheel of an automobile, with the cylindrical portion of the end cap 74 being removed for purposes of illustration. Let it be further assumed that the circumferential portions of the components that make up the lock assembly 50 have been "unwound" or "flattened out" so that this circumference is being seen in plan view. In the views of FIGS. 4A through 4D, the arrow indicating movement upwardly on the page indicates rotation of the hub assembly 10 in a counterclockwise direction, which would be in the direction of rotation when the automotive vehicle is traveling forwardly.

In FIG. 4A, the wheel hub assembly 10 is shown with its clutch lock assembly 50 in its disengaged position where the control dial 66 has been rotated so that the contours of the two cam surfaces 70 and 72 each fit against the other. In this position, the urging of the wave spring 62 holds the lock cage 52 in its disengaged position, with the lock fingers 54 retracted from the roller cage slots 27.

As described previously herein, with the clutch lock assembly 50 in its disengaged position as shown in FIG. 4A, the hub assembly 10 operates in the manner of a conventional overrunning clutch hub assembly. That is to say, with the drive axle 16 being rotated under power, the inner hub 12 rotates relative to the housing 18 to cause engagement of the roller clutch elements 26 and thus drive the wheel 22. In a situation where the wheel 22 tends to overrun the axle 16, the housing 18 rotates beyond the hub 12 to cause disengagement of the clutching elements 26, with the action of the friction shoes 34 preventing lockup in the opposite direction.

To hold the dial cam member 66 in position, the dial cam member 66 is provided with small protrusions 66a that interfit with matching protrusions 78a on the adjacent portion of the cap 78. When it is desired to place the wheel 22 in locking engagement with the drive axle 16, so that there is no relative rotation of the wheel 22 and axle 16, the control cam 66 is pushed in slightly to disengage the protrusions 66a and 78a and is then manually rotated to its locked position, shown in FIG. 4B. (In the particular arrangement shown herein, a 60° rotation of the control dial 66 accomplishes the movement from the unlocked to the locked position.) In the locking position of FIG. 4B, the protruding portions 70a and 72a of the cam surfaces 70 and 72 engage each other in a manner to move the lock cage 52 against the urging of the wave spring 62 axially in an inside direction so that the lock fingers 54 extend into the outside end portions of the roller cage slots 27. In this position, the roller cage 28 is caused to rotate with the outer housing 18, so that in the event the wheel 22 and drive axle 16 are moved relative to one another, the clutch elements 26 move with the housing 18 to cause a wedging engagement of the clutch elements 26. The force of the bushing centering spring 94 is sufficient to overcome the frictional force of the shoes 34 to overcome the tendency of the roller cage 28 to remain stationary with the vehicle structure 38.

Figure 4C:
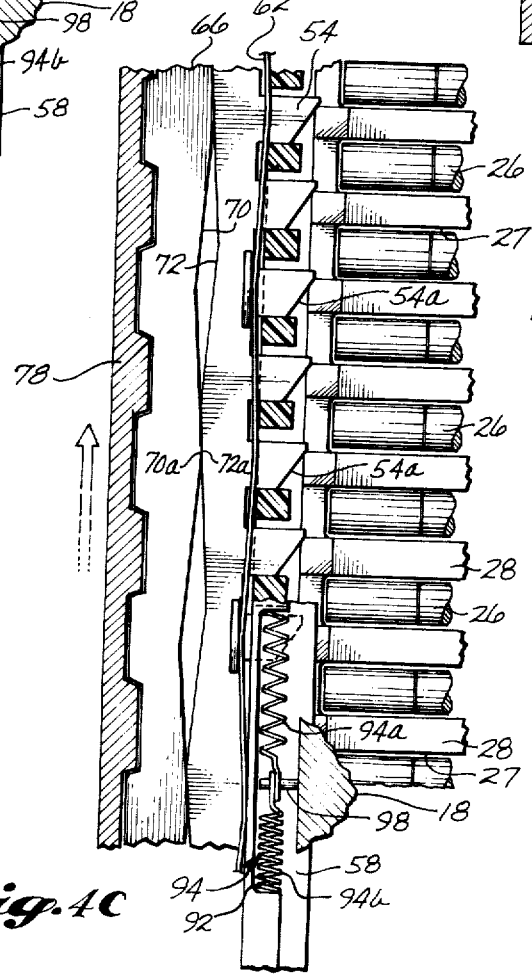

As indicated previously herein, in the event that there is some "scrubbing" between the housing 18 and the hub 12, the action of the cam surfaces 40 of the hub 12 will tend to rotate the roller cage 28 a short arcuate distance relative to the housing 18. Since the centering spring 94 permits such limited relative rotation, the lock cage 52 then moves with the hub 12 rotationally with respect to the control cam 66, thus moving the two cam surfaces 70 and 72 relative to each other. As the cam surfaces 70 and 72 move from their full lock position, the urging of the wave spring 62 pushes the lock fingers 54 toward disengagement with the roller cage 28. It will be noted that the inside edge of each of the lock fingers 54 is slanted, as at 54a, in an outside direction rearwardly from the linear forward path of travel. This permits the outer edge portions of the roller cage 28 to move along the slanted end faces 54a of the lock fingers 54 as seen in FIG. 4C. Also, it will be noted that in the position of 4C, the lower portion 94b of the centering spring 94 is compressed to permit the relative rotation of the lock cage 52 with respect to the control cam 66.

Figure 4D:
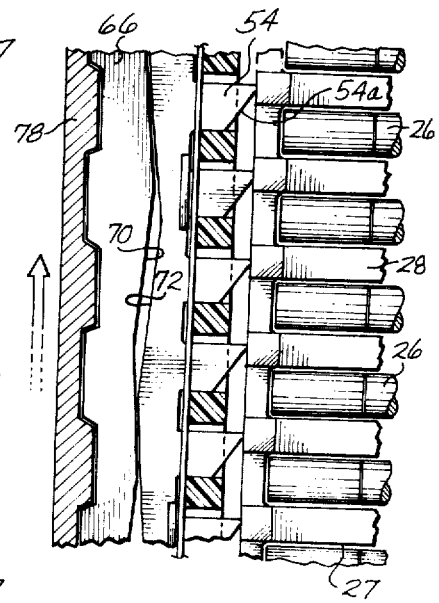
Figure 5:
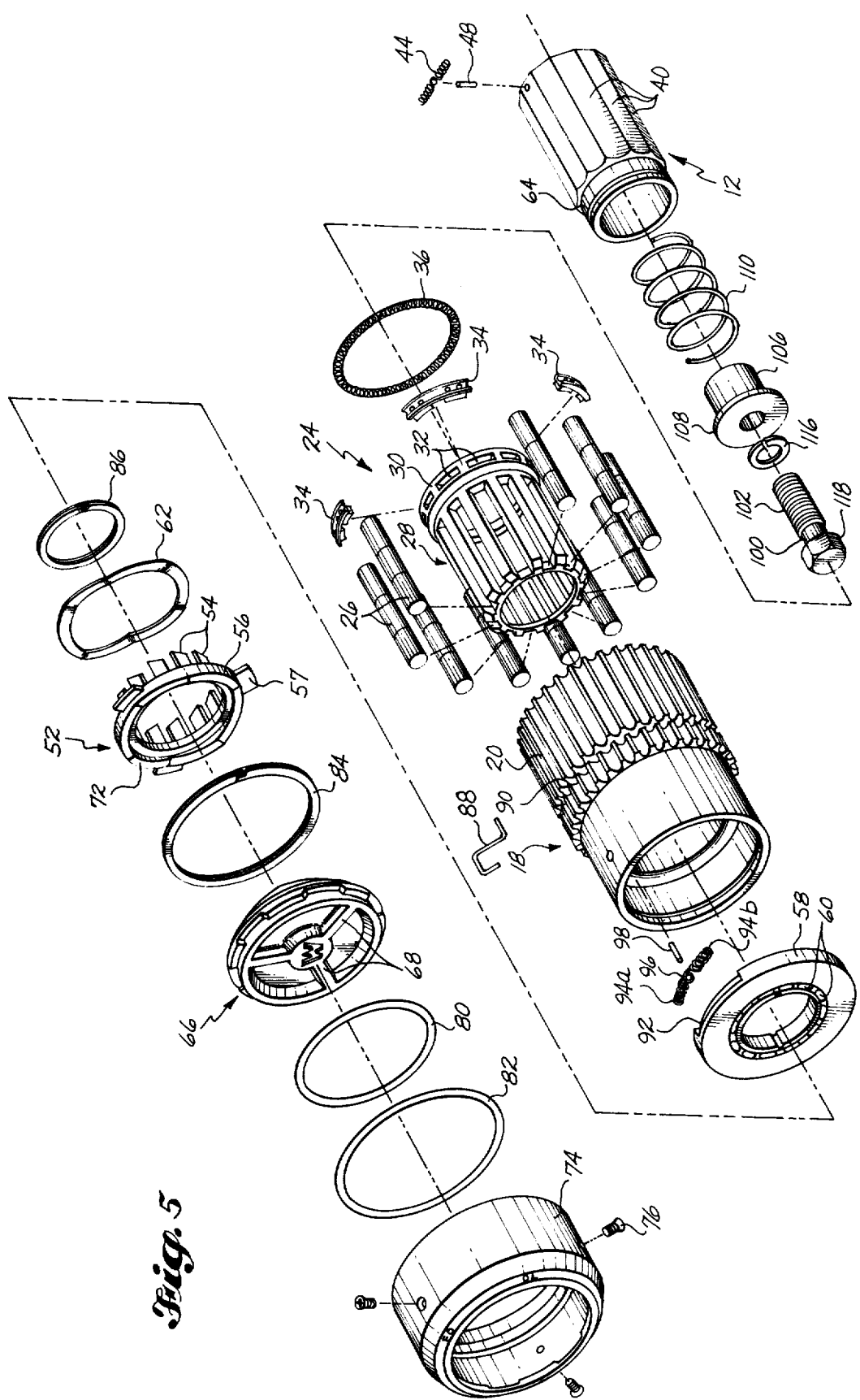
FIG. 5 is an isometric exploded view showing the individual components of the present invention.

As the "scrubbing" between the hub 12 and the housing 18 continues, the lock cage 52 shifts to the extent that the cam surfaces 70 and 72 have moved sufficiently from their locked position to permit the lock fingers 54 to clear the cage slots 27. As soon as this happens, the compressed portion 94b of the bushing centering spring 94 causes the bushing 58 and lock cage 52 to move clockwise (i.e. downwardly as seen in FIG. 4D) to cause each of the lock fingers to shift over to its next roller cage slot 27. Thus, it can be seen that if in spite of the functional lockup between the hub 12 and the housing 18 there is permitted rotational shifting between these two components, the spring interconnection (i.e. the bushing centering spring 94) between the clutch lock assembly 50 and the housing 18 permits such shifting without damaging the mechanical interlock between the housing 18 and clutch lock assembly 50. Beyond this, if such relative shifting between the housing 18 and hub 12 continues, the lock assembly 50 is able to mechanically shift to another locking position to prevent damage to the components of the wheel hub assembly 10.

Attention is now directed to the components 100 through 118, by which the hub assembly is mounted to the axle 16. It will be noted that the hub 12 being splined to the axle 16 is able to shift moderately in an outside direction against the compression spring 110. In circumstances where an automobile wheel has an articulated mounting, there is a tendency for the wheel 22 to move laterally on its axle to a moderate extent. This particular spring mounting of the hub assembly 10 permits the hub assembly 10 to move outwardly with the wheel 22, thus permitting the wheel 10 to shift laterally along the axle 16 to a moderate extend as the wheel 10 articulates.

What is claimed is:
1. A hub assembly, comprising:
  a. an inner hub member adapted to be connected to a drive axle for rotation therewith and having outwardly facing inner clutch cam surfaces;
  b. an outer housing adapted to be connected to a wheel for rotation therewith and having an inwardly facing outer clutch surface;
  c. a clutch assembly comprising:
    1. a plurality of wedging clutch elements mounted between the hub member and the housing movable between an engaged position between the inner cam surfaces and the outer clutch surface, and a release position where said housing is disengaged said hub member;
    2. a cage means for positioning said clutch elements between the hub member and the housing;
  d. a clutch lock means having a first unlocked position in which the clutch assembly is movable between its engaged position and its release position, and a second lock position which it interconnects the cage means with the housing and brings the hub member and the housing into constant clutching engagement;
  e. lock shifting means comprising a movable interconnecting means between the clutch lock means and at least one of the hub member and the housing which provides for limited relative rotational movement between the hub member and the housing while maintaining the lock position of said clutch lock means.

2. The assembly as recited in claim 1, wherein said lock shifting means comprises spring means interconnecting said clutch lock means with said housing, with said spring means yieldingly resisting relative movement between said housing and said clutch lock means.

3. The assembly as recited in claim 2, wherein one of said housing and said clutch lock means has an elongate slot therein aligned with the direction of relative rotation between said clutch lock means and the housing, and said spring means is positioned in said slot and connected at an intermediate point thereof to the other of said housing and said clutch lock means.

4. The assembly as recited in claim 3, wherein said spring means is a compression spring, and said slot is an arcuate slot located in the periphery of said clutch lock means.

5. The assembly as recited in claim 2, wherein said clutch lock means comprises a lock member movable toward and into locking engagement with said clutch assembly, with said spring means limiting the relative rotational movement between said lock member and said housing, whereby limited relative movement is provided between said clutch assembly and said housing.

6. The assembly as recited in claim 5, wherein said clutch lock means further comprises a mounting member in which said lock member is axially reciprocably mounted with respect to the mounting member but is fixed rotationally with respect thereto.

7. The assembly as recited in claim 5, wherein said clutch lock means comprises a mounting bushing having a plurality of axially oriented slots therein, and said lock member comprises a lock cage having a plurality of lock fingers extending axially through the openings of the mounting bushing.

8. The assembly as recited in claim 7, further comprising an actuating cam operatively engaging said clutch lock means in a manner that rotational movement of said actuating cam causes a cam surface thereof to move said lock cage to its locking position.

9. The assembly as recited in claim 5, further comprising a rotatably mounted cam means which operatively engages said lock member in a manner that rotational movement of said cam means causes a cam surface thereof to move said lock member into engagement with said clutch assembly.

10. The assembly as recited in claim 9, wherein there is return spring means operatively engaging and biasing said lock member to its disengaged position when said cam actuating means is moved to its lock disengaging position.

11. The assembly as recited in claim 1, wherein said clutch lock means comprises a lock member movable into locking engagement with said clutch means, and said lock shifting means comprises lock member moving means responsive to relative rotational movement between the hub member and the housing to move said lock member toward its disengaged position.

12. The assembly as recited in claim 11, wherein said lock member has a plurality of spaced locking positions relative to said cage means, and said lock member moving means includes means to move said lock member from one locking position to a following locking position.

13. The assembly as recited in claim 12, whereas said lock member comprises a lock cage having a plurality of fingers movable axially inwardly into engagement with related slots in said cage means of the clutch assembly, and said lock member moving means comprising means to shift said lock cage axially out of engagement and to a following locking position.

14. The assembly as recited in claim 13, further comprising a lock cage mounting bushing mounted adjacent an axially outward portion of said clutch cage means, said mounting bushing having axial slot means reciprocable interengaging with the fingers of the lock cage and providing for relative axial movement between the mounting bushing and the lock cage, said mounting bushing being connected to said housing.

15. The assembly as recited in claim 14, wherein said mounting bushing is reciprocably connected to said housing by a spring means whereby relative rotation between said bushing and said housing is limited.

16. The assembly as recited in claim 15, wherein there is a slot in said mounting bushing in which said spring means is received and said spring means is attached at an intermediate point thereof to said housing.

17. A hub assembly, comprising:
a. an inner hub adapted to be connected to a drive axle for rotation therewith and having outwardly facing clutch cam surfaces;
b. an outer housing adapted to be connected to a wheel for rotation therewith and having an inwardly facing clutch surface;
c. a clutch assembly comprising:
  1. a plurality of wedging clutch elements mounted between the hub and the housing for movement between an engaged position between the inner cam surfaces and the outer clutch surface, and a release position wherein said housing is disengaged from said hub;
  2. a cage means for positioning said clutch elements between the clutch and the housing;
d. a clutch lock member mounted in said housing and movable from an unlocking position axially toward said clutch assembly to a locking position wherein the lock member engages the clutch assembly and causes the clutch assembly to move rotatably with the housing, said clutch lock member engaging the clutch assembly in a manner to permit providing for limited relative movement between the housing and the clutch assembly,
e. an actuating member mounted in said housing and movable rotatably toward and from a locking position in which said lock member is engaged and moved to and from its locking position,
whereby when said actuating member is in its locking position, and limited relative movement is provided between said clutch assembly and said housing and said lock member moves relative to said actuating member and becomes disengaged from the clutch assembly.

18. The assembly as recited in claim 17, wherein said lock member has a plurality of locking positions relative to said clutch assembly, with circumferentially yielding means engaging said lock member whereby said lock member is movable rotationally from its previous locking position toward a disengaged position and to a following locking position.

19. The assembly as recited in claim 17, wherein said actuating member is a cam member having an axially inwardly facing cam surface engaging said lock member and moving it to its locking position, whereby relative rotation of said lock member with respect to the cam member causes said lock member to move toward its disengaged position.

20. The assembly as recited in claim 18, wherein spring means interconnects the lock member with the housing, with the spring means permitting limited relative rotation of the lock member toward a disengaged position, with said spring means then moving said lock member to a following locking position.

21. The assembly as recited in claim 20, wherein one of said housing and said clutch lock member have an elongate slot therein aligned with the direction of relative rotation between said clutch lock member and the housing, and said spring means is positioned in said slot and connected at an intermediate point thereof to the other of said housing and said clutch lock member.

22. The assembly as recited in claim 21, wherein said spring means is a compression spring, and said slot is an arcuate slot located in the periphery of said clutch lock member.

23. The assembly as recited in claim 17 further comprising a mounting member in which said lock member is axially movably mounted with respect to the mounting member but fixed rotationally with respect thereto.

24. The assembly as recited in claim 23, wherein said mounting member comprises a mounting bushing having a plurality of axially oriented slots therein, and said lock member comprises a lock cage having a plurality of lock fingers extending axially through the openings of the mounting bushing.

25. The assembly as recited in claim 17, wherein said actuating member comprises an actuating cam which is in relative rotatable operatively engagement with said clutch lock member whereby rotational movement of said actuating cam causes a cam surface thereof to move said lock cage to its locking position.

26. The asembly as recited in claim 25, wherein return spring means operatively engages and biases said lock member to its disengaged position when said cam actuating means is moved to its lock disengaging position.

27. The assembly as recited in claim 17, wherein said lock member comprises a lock cage having a plurality of fingers movable axially inwardly into engagement with related slots in said cage means of the clutch assembly.

28. The assembly as recited in claim 27, further comprising a lock cage mounting bushing mounted adjacent an axially outward portion of said clutch cage means, said mounting bushing having slot means interengaging with the fingers of the lock cage so as thereby providing for relative axial movement between the mounting bushing and the lock cage, said mounting bushing being connected to said housing.

29. The assembly as recited in claim 28, wherein there is spring means connects said mounting bushing to said housing, thereby providing for limited relative rotation therebetween.

30. The assembly as recited in claim 29, wherein a slot means in said mounting bushing receives said spring means and said spring means is attached to said housing at an intermediate point thereof.

31. The assembly as recited in claim 17, wherein:
  a. said actuating member comprises a cam member having an axially inwardly facing rotatable cam surface which engages said lock member and move moves it to its locking position, whereby relative rotation of said lock member with respect to the cam member causes movement of the lock member toward its disengaged position,
  b. spring means interconnects the lock member with the housing and provides for limited relative rotation of the lock member toward a disengaged position and movement of said lock member to a following locking position,
  c. there is a mounting bushing having a plurality of axially oriented slots therein, and said lock member comprises a lock cage having a plurality of lock fingers extending axially through the openings of the mounting bushing, and
  d. said lock member engages a return spring means operatively engaging said lock member and urges said lock member axially to its disengaged position when said cam actuating means is moved to its lock disengaging position.

* * * * *